United States Patent
Vaccaro et al.

(10) Patent No.: US 11,233,384 B2
(45) Date of Patent: Jan. 25, 2022

(54) HANGER FOR MOUNTING CABLES

(71) Applicant: CommScope Technologies LLC, Hickory, NC (US)

(72) Inventors: Ronald A. Vaccaro, Taylorsville, NC (US); Aviral Joshi, Chicago, IL (US); Christopher Stockman, Bella Vista, AR (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/144,243

(22) Filed: Jan. 8, 2021

(65) Prior Publication Data
US 2021/0281059 A1    Sep. 9, 2021

Related U.S. Application Data

(60) Provisional application No. 62/984,373, filed on Mar. 3, 2020.

(51) Int. Cl.
*H02G 3/32* (2006.01)
*F16L 3/04* (2006.01)
*F16L 3/22* (2006.01)
*F16L 3/133* (2006.01)
*F16L 3/127* (2006.01)

(52) U.S. Cl.
CPC ............... *H02G 3/32* (2013.01); *F16L 3/04* (2013.01); *F16L 3/127* (2013.01); *F16L 3/133* (2013.01); *F16L 3/221* (2013.01)

(58) Field of Classification Search
CPC ..... F16L 3/12; F16L 3/13; F16L 3/221; F16L 3/222; F16L 3/10; F16L 3/04; F16B 2/22; F16B 2/04; F16B 21/05; H02G 3/32; H02G 7/10

See application file for complete search history.

(56) References Cited

U.S. PATENT DOCUMENTS

| | | | |
|---|---|---|---|
| 7,293,745 B2 * | 11/2007 | Catapano | F16L 3/222 248/61 |
| 8,191,836 B2 | 6/2012 | Korczak | |
| 9,866,044 B1 | 1/2018 | Bell | |
| 9,903,510 B2 * | 2/2018 | Joshi | F16L 3/13 |
| 10,253,906 B2 * | 4/2019 | Vaccaro | H02G 3/32 |
| 10,508,757 B2 * | 12/2019 | Vaccaro | F16L 3/221 |
| 2002/0066833 A1 * | 6/2002 | Ferrill | H02G 3/32 248/62 |
| 2006/0249633 A1 * | 11/2006 | Korczak | F16L 3/24 248/62 |
| 2018/0163899 A1 * | 6/2018 | Rajpal | H02G 3/32 |
| 2020/0003338 A1 * | 1/2020 | Vaccaro | H01Q 1/12 |

* cited by examiner

Primary Examiner — Tan Le
(74) Attorney, Agent, or Firm — Myers Bigel, P.A.

(57) ABSTRACT

A cable hanger includes a generally flat base and first and second opposed arms extending in a first direction from the base. Hooks are positioned on free ends of the arms. The arms form a gap configured to receive and grasp a cable. The base includes a cross-member that divides two arcuate openings, the cross-member attached at each end with a frangible section.

20 Claims, 6 Drawing Sheets

HANGER FOR MOUNTING CABLES

RELATED APPLICATION

The present application claims priority from and the benefit of U.S. Provisional Patent Application No. 62/984,373, filed Mar. 3, 2020, the disclosure of which is hereby incorporated herein by reference in its entirety.

FIELD OF THE INVENTION invention relates generally to devices for supporting cables and, in particular, to hangers for securing cables to support structures.

BACKGROUND OF THE INVENTION

Cable hangers are commonly used to secure cables to structural members of antenna towers and or along tunnel walls. Generally, each cable is attached to a structural member by cable hangers mounted at periodically-spaced attachment points.

Antenna towers and or tunnels may be crowded due to the large numbers of cables required for signal-carrying. Over time, as systems are added, upgraded and/or expanded, installation of additional cables may be required. To conserve space, it may be desirable for each set of cable hangers to secure more than a single cable. Certain cable hangers have been constructed to secure multiple cables; other cable hangers have a stackable construction that permits multiple cable hangers to be interlocked extending outwardly from each mounting point/structural member. Stacked and multiple-cable hangers significantly increase the number of cables mountable to a single attachment point.

One popular stackable cable hanger is discussed in U.S. Pat. No. 8,191,836 to Korczak, the disclosure of which is hereby incorporated herein in its entirety. Hangers disclosed therein have generally a U- or C-shaped profile with rounded arms. A locking projection extends from the free end of each arm, and the "root" of the hanger that spans the fixed ends of the arms has a large aperture. The hanger can hold a cable between the arms; gripping of the cable is enhanced by short fingers that extend inwardly from the arms to engage the cable. Hangers can be "stacked" onto each other by inserting the locking projections of one hanger into the large aperture of the next hanger.

One variety of cable hanger of this type is the SNAP-STAK® hanger, available from CommScope, Inc. (Joliet, Ill.). The SNAP-STAK® hanger is offered in multiple sizes that correspond to the outer diameters of different cables. This arrangement has been suitable for use with coaxial power cables, which tend to be manufactured in only a few different outer diameters. Modified versions of these hangers are discussed in U.S. Pat. No. 9,866,004 (hereby incorporated herein by reference in full); these arrangements may be more desirable for fiber optic cables, which tend to be manufactured in a much greater variety of diameters, and which tend to be much heavier than coaxial cables (sometimes as much as three times heavier per unit foot), which induces greater load and stress on the hangers.

Cable hangers for smaller cables have also been proposed. U.S. Pat. No. 10,253,906 to Vaccaro discusses cable hangers formed of polymeric material. One such hanger is shown in FIGS. 1-3 and designated broadly at 810. The cable hanger 810 includes a base 806 and arms 805 with hooks 807 and stops 818. The cable hanger 810 also includes a pocket 820a to hold a cable. The cable hanger 810 further includes braces 840 that extend between the base 806 and the stops 818 on the arms 805. The braces 840 are positioned radially outwardly sufficiently to enable the hooks 807 of a second cable hanger 810 to comfortably engage the underside of the base 806. Also, the cable hanger 810 includes a cross-beam 808 that extends across the base 806 to form two holes 809a, 809b in the base 806. These holes 809a, 809b receive the hooks 807 of a second cable hanger 810.

The cable hanger 810 also includes three posts 830a, 830b, 830c. The posts 830a, 830c are located on opposite sides of the pocket 820a and extend generally toward each other, and the post 830b extends generally parallel to the arms 805. The posts 830a-c can assist in gripping a cable residing within the pocket 820a.

It may be desirable to provide additional cable hanger designs.

SUMMARY

As a first aspect, embodiments of the invention are directed to a cable hanger comprising: a generally flat base; and first and second opposed arms extending in a first direction from the base. Hooks are positioned on free ends of the arms. The arms form a gap configured to receive and grasp a cable. The base includes a cross-member that divides two arcuate openings, the cross-member attached at each end with a frangible section.

As a second aspect, embodiments of the invention are directed to a cable hanger comprising: a generally flat base; and first and second opposed arms extending in a first direction from the base. Hooks are positioned on free ends of the arms. The arms form a gap configured to receive and grasp a cable. The base includes a cross-member that divides two arcuate openings, the cross-member attached at each end with a narrowed section.

As a third aspect, embodiments of the invention are directed to a method of mounting a cable hanger, comprising:

(a) providing a first cable hanger comprising:
  a generally flat base; and
  first and second opposed arms extending in a first direction from the base;
  wherein hooks are positioned on free ends of the arms;
  wherein the arms form a gap configured to receive and grasp a cable; and
  wherein the base includes a cross-member that divides two arcuate openings, the cross-member attached at each end with a frangible section.

(b) removing the cross-member to produce a single opening from the two arcuate openings; and (c) mounting a second cable hanger in the single opening.

DETAILED DESCRIPTION

Figure 1:
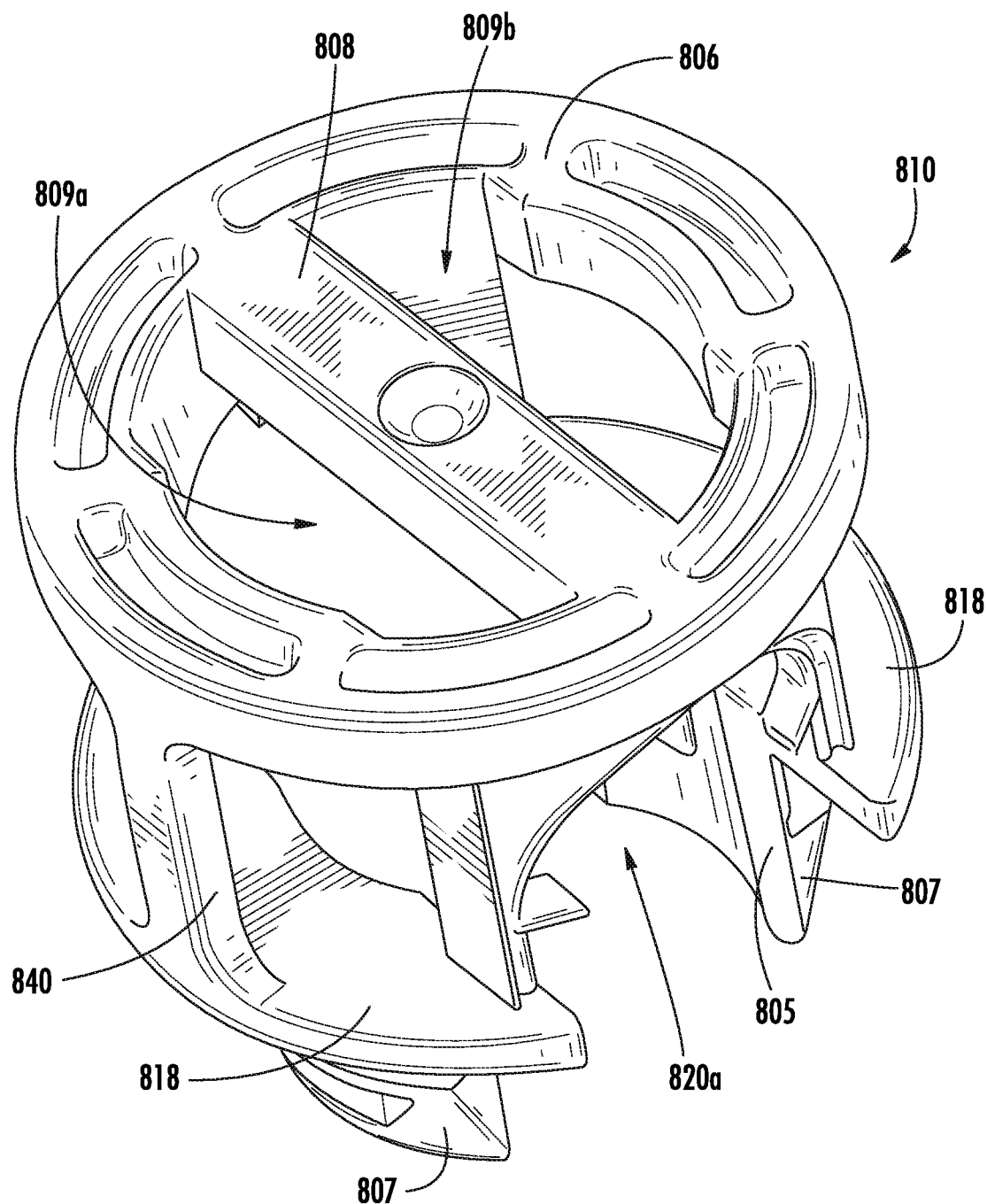
FIG. 1 is a perspective view of a prior art cable hanger.

The present invention will now be described more fully hereinafter, in which embodiments of the invention are shown. This invention may, however, be embodied in different forms and should not be construed as limited to the embodiments set forth herein. Rather, these embodiments are provided so that, this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. The device may be otherwise oriented (rotated 90 degrees or at other orientations) and the spatially relative descriptors used herein interpreted accordingly.

Well-known functions or constructions may not be described in detail for brevity and/or clarity.

Figure 2:
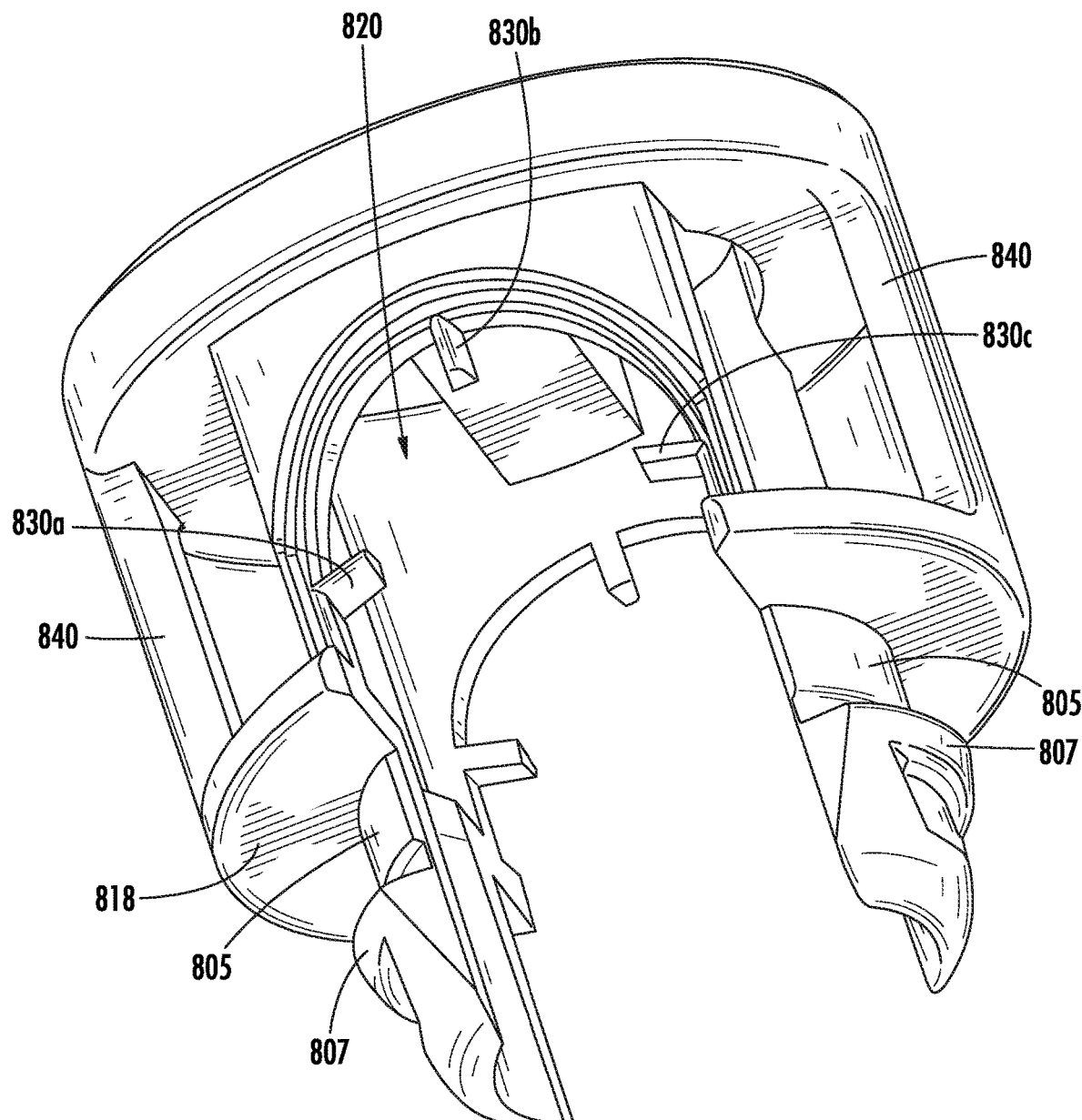
FIG. 2 is an opposite perspective view of the cable hanger of FIG. 1.
Figure 3:
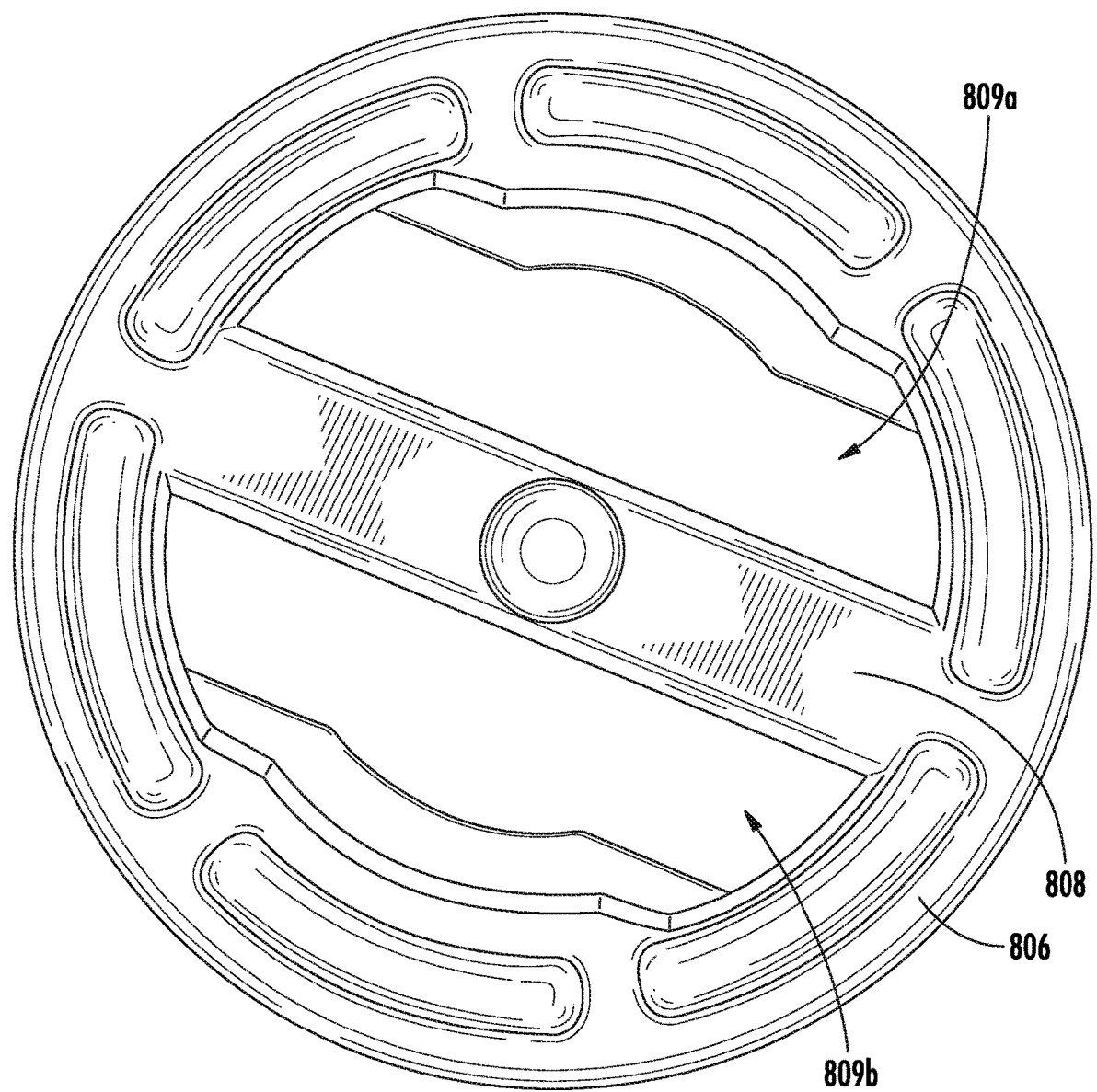
FIG. 3 is a side view of the cable hanger of FIG. 1.

Referring again to FIGS. 1-3, the cable hanger 810 shown therein is configured to receive a cable in the pocket 820a, and is also configured to provide a mounting location for a second cable hanger with locking arms by receiving the locking arms in the holes 809a, 809b. However, the presence of the cross-beam 808 can limit the rotational orientation in which the second cable hanger can be positioned. In other words, the cross-beam 808 can prevent the second cable hanger from being mounted relative to the first cable hanger 810 at any desired rotational position, which may limit its utility in certain deployments.

Figure 4:
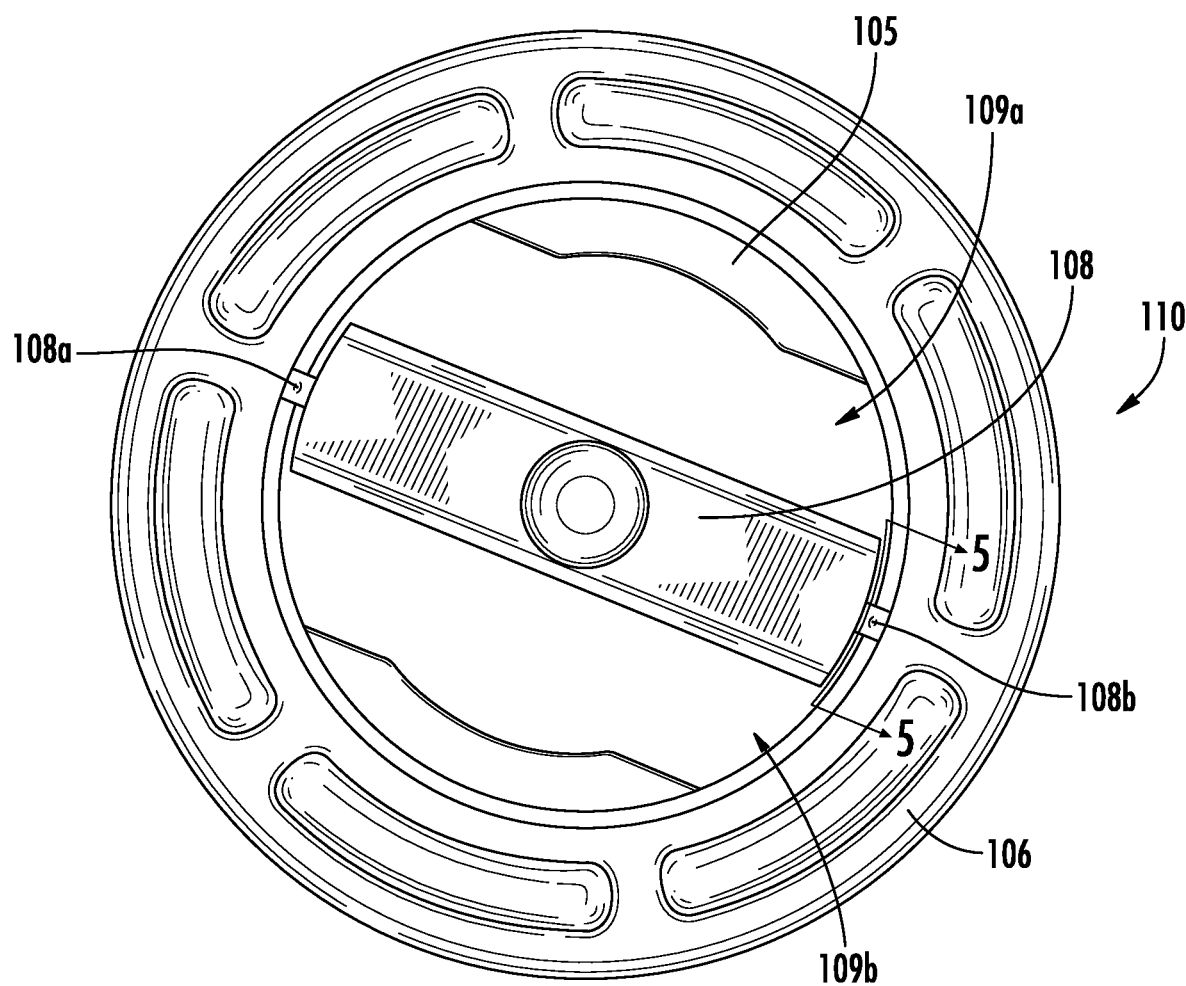
FIG. 4 is a top view of a cable hanger according to embodiments of the invention.
Figure 5:
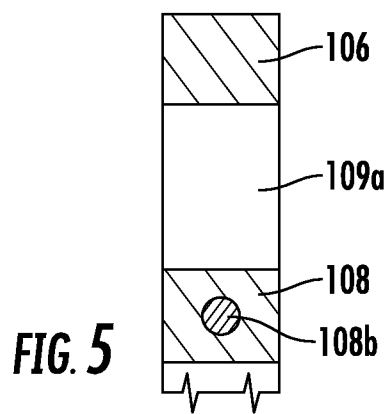
FIG. 5 is a partial side section view of the cable hanger of FIG. 4 taken along section lines 5-5.
Figure 7:
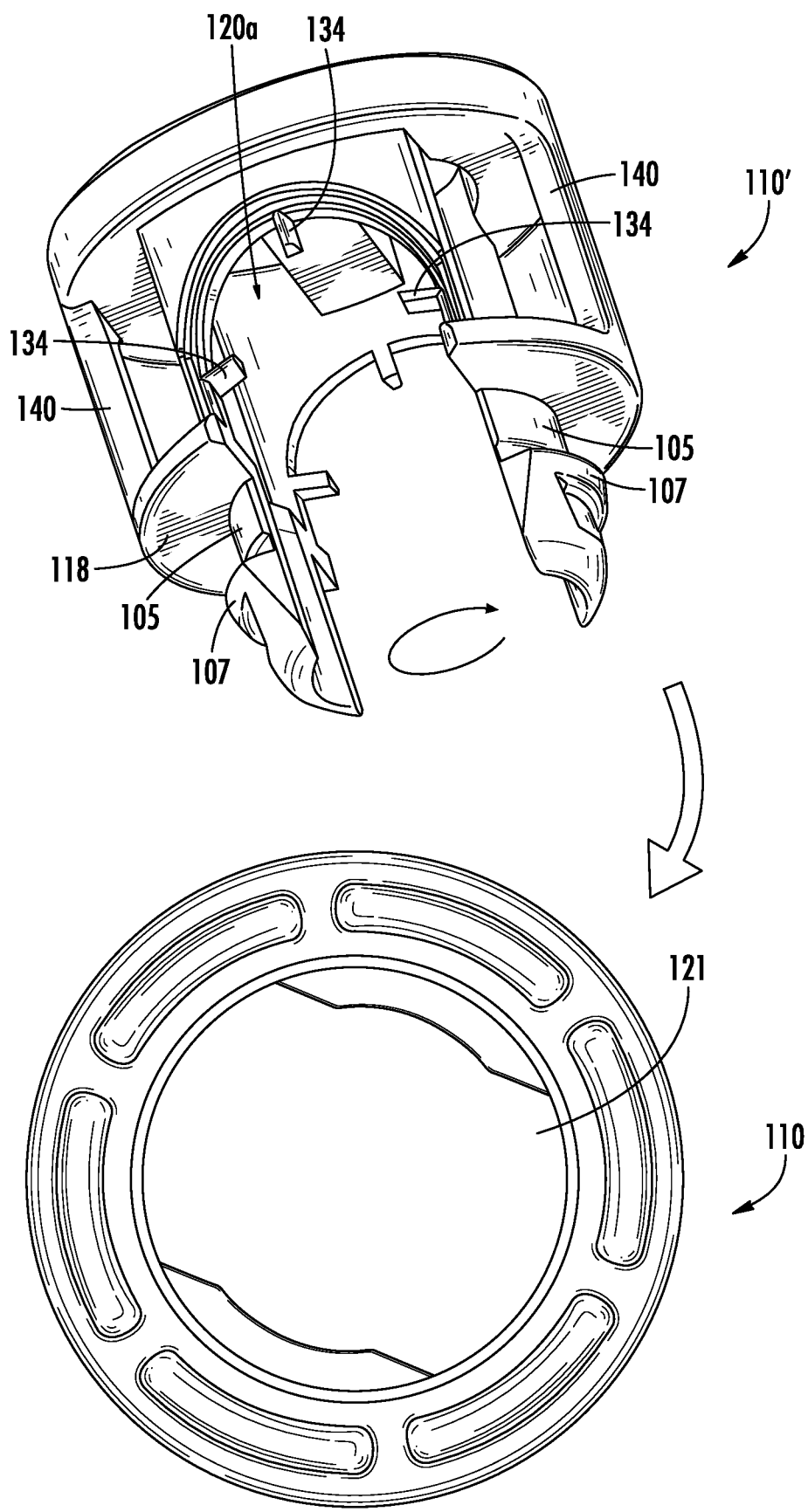
FIG. 7 is a perspective view of the cable hanger of FIG. 6 prepared to receive a second cable hanger for mounting.

This issue can be addressed by the cable hanger 110, which is illustrated in FIGS. 4 and 5. The cable hanger 110 is generally similar to the cable hanger 810 discussed above: the cable hanger 110 includes a base 106 and arms 105 with hooks 107 and stops 118 (not shown in FIGS. 4 and 5—see FIG. 7). The cable hanger 110 also includes a pocket 120a to hold a cable (not shown in FIGS. 4 and 5—see FIG. 7). The cable hanger 110 further includes braces 140 (not shown in FIGS. 4 and 5—see FIG. 7) that extend between the base 106 and the stops 118 on the arms 105. Also, the cable hanger 110 includes a cross-beam 108 that extends across the base 106 to form two holes 109a, 109b in the base 106. These arcuate holes 109a, 109b are sized and configured to receive the hooks 107 of a second cable hanger 110'.

Figure 6:
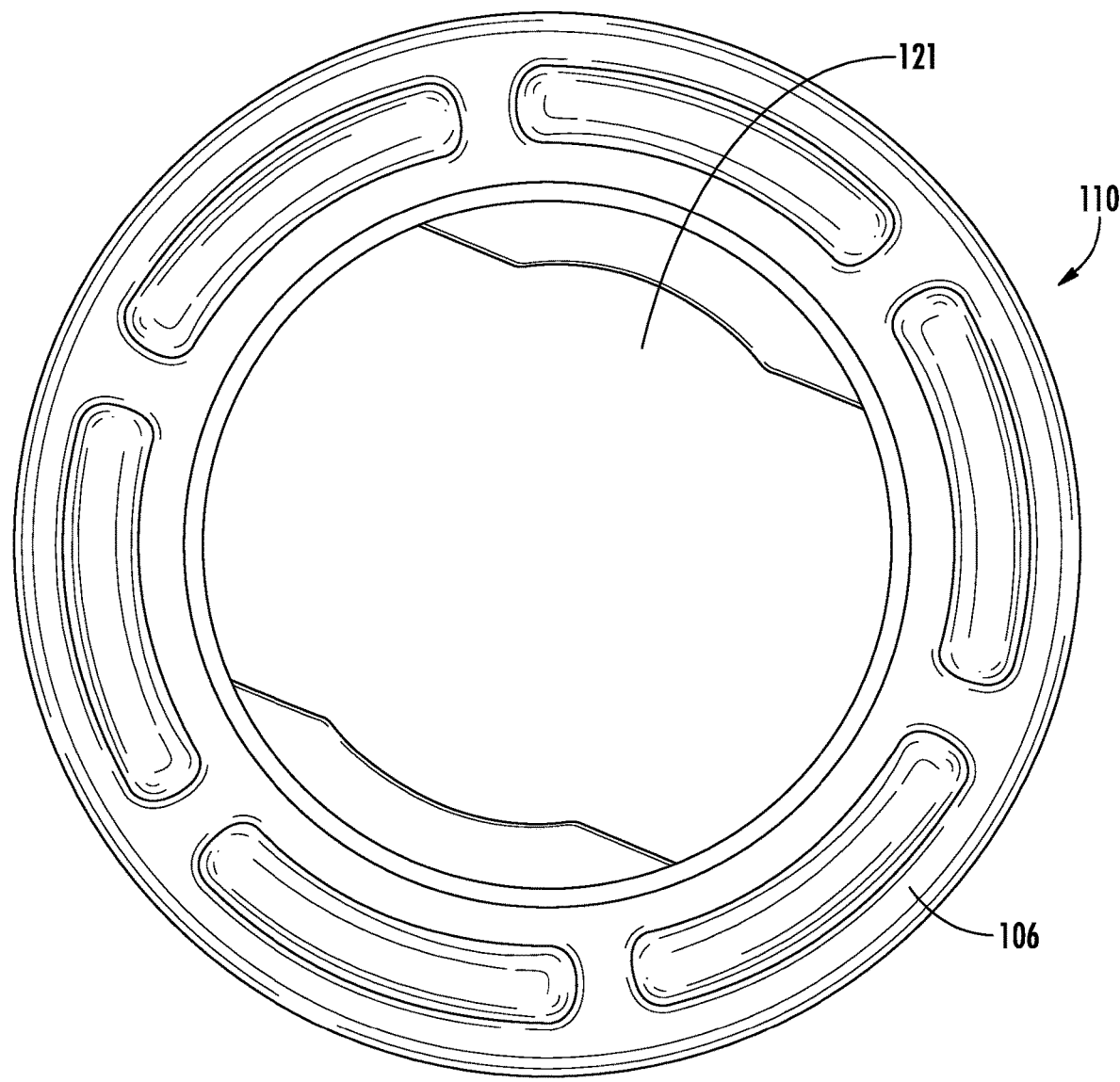
FIG. 6 is a top view of the cable hanger of FIG. 4 with the cross-beam removed.

Notably, and as can be seen in FIGS. 4 and 5, the cross-beam 108 is fixed to the base 106 at its ends by two narrowed sections 108a, 108b. The narrowed sections 108a, 108b are frangible and are included to enable the cross-beam 108 to be selectively removed by a technician. The cross-beam 108 can be removed by any known technique; for example, it may be removed via a prying action with a screwdriver or a twisting action with a pair of pliers (see the resulting hanger in FIG. 6). Once the cross-beam 108 is removed, the remaining hole 121 (which is formed by both of the prior holes 109a, 109b and the space formerly occupied by the cross-beam 108) can receive the hooks of another, second cable hanger 110' for the mounting thereof (see FIG. 7). Because the cross-beam 108 is absent, there is no structure in the hole 121 that limits the rotational orientation of the second cable hanger 110' relative to the first cable hanger 110; instead, it can be mounted at any angle, which can allow the second cable hanger to grasp a cable that approaches it at any desired angle.

Those of skill in this art will appreciate that the cable hanger 110 may take other forms. For example, the narrowed sections 108a, 108b are shown in FIG. 5 as being circular in cross-section, but may take other cross-sectional forms (e.g., oval, square, rectangular, triangular, cruciform, etc.) and be suitable for use with the cable hanger 110. The arms 105 may be of different length or width, and/or the hooks 107 may be configured differently. The hole 121 resulting after removal of the cross-beam 108 may be of any size, but typically has a ¼ inch nominal diameter.

The cable hanger 110 may be formed of any suitable material, but is typically formed of a polymeric material. Exemplary materials include acetal resin. The cable hanger may be formed as a unitary member (often via injection molding). The cable hanger may also be configured to grasp different sizes of cables: for example, one size of hanger may be employed to mount cables having an outer jacket with a 4-7 mm diameter (DOJ), another size of hanger may mount 7-10 mm DOJ cables, and a third size of hanger may mount 10-14 mm DOJ cables.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:
1. A cable hanger, comprising:
   a generally flat base; and
   first and second opposed arms extending in a first direction from the base;
   wherein hooks are positioned on free ends of the arms;
   wherein the arms form a gap configured to receive and grasp a cable; and
   wherein the base includes a cross-member that divides two arcuate openings, the cross-member attached at each end with a frangible section.

2. The cable hanger defined in claim 1, wherein the cable hanger is a unitary member formed of a polymeric material.

3. The cable hanger defined in claim 1, wherein each of the free ends of the arms has an arcuate cross-section.

4. The cable hanger defined in claim 1, wherein the two arcuate openings are configured such that removal of the cross-member results in a single, generally round hole.

5. The cable hanger defined in claim 1, wherein at least one post extends into the gap.

6. The cable hanger defined in claim 5, wherein the at least one post extends into the gap from the base, the post extending generally in the same direction as the arms.

7. The cable hanger defined in claim 1, in combination with a cable in the gap grasped by the arms.

8. A cable hanger, comprising:
a generally flat base; and
first and second opposed arms extending in a first direction from the base;
wherein hooks are positioned on free ends of the arms;
wherein the arms form a gap configured to receive and grasp a cable; and
wherein the base includes a cross-member that divides two arcuate openings, the cross-member attached at each end with a narrowed section.

9. The cable hanger defined in claim 8, wherein the cable hanger is a unitary member formed of a polymeric material.

10. The cable hanger defined in claim 8, wherein each of the free ends of the arms has an arcuate cross-section.

11. The cable hanger defined in claim 8, wherein the two arcuate openings are configured such that removal of the cross-member results in a single, generally round hole.

12. The cable hanger defined in claim 8, wherein at least one post extends into the gap.

13. The cable hanger defined in claim 12, wherein the at least one post extends into the gap from the base, the post extending generally in the same direction as the arms.

14. The cable hanger defined in claim 8, in combination with a cable in the gap grasped by the arms.

15. A method of mounting a cable hanger, comprising the steps of:
(a) providing a first cable hanger comprising:
a generally flat base; and
first and second opposed arms extending in a first direction from the base;
wherein hooks are positioned on free ends of the arms;
wherein the arms form a gap configured to receive and grasp a cable; and
wherein the base includes a cross-member that divides two arcuate openings, the cross-member attached at each end with a frangible section;
(b) removing the cross-member to produce a single opening from the two arcuate openings; and
(c) mounting a second cable hanger in the single opening.

16. The method defined in claim 15, further comprising the step of grasping a first cable with the first cable hanger.

17. The method defined in claim 16, further comprising the step of grasping a second cable with the second cable hanger.

18. The method defined in claim 15, wherein the first cable hanger is a unitary member formed of a polymeric material.

19. The method defined in claim 15, wherein each of the free ends of the arms has an arcuate cross-section.

20. The method defined in claim 15, wherein the single opening is a generally round hole.

* * * * *